United States Patent
Zhang et al.

(10) Patent No.: US 11,558,267 B2
(45) Date of Patent: Jan. 17, 2023

(54) METHOD, APPARATUS, AND SYSTEM FOR TIME SYNCHRONIZATION BASED ON IN-BAND TELEMETRY

(71) Applicant: Tsinghua University, Beijing (CN)

(72) Inventors: Qianli Zhang, Beijing (CN); Xiangyu Tang, Beijing (CN); Jilong Wang, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 17/412,754

(22) Filed: Aug. 26, 2021

(65) Prior Publication Data

US 2022/0173986 A1 Jun. 2, 2022

(30) Foreign Application Priority Data

Nov. 27, 2020 (CN) .......................... 202011358994.6

(51) Int. Cl.
*H04L 43/045* (2022.01)
*H04L 43/067* (2022.01)
(Continued)

(52) U.S. Cl.
CPC .......... *H04L 43/045* (2013.01); *H04L 43/067* (2013.01); *H04L 43/0864* (2013.01); *H04L 43/0894* (2013.01)

(58) Field of Classification Search
None
See application file for complete search history.

(56) References Cited

U.S. PATENT DOCUMENTS 6,275,990 B1* 8/2001 Dapper .................. H04H 20/69
375/E7.002
9,385,917 B1* 7/2016 Khanna ................... H04L 41/12
(Continued)

FOREIGN PATENT DOCUMENTS

| CN | 102932905 A | 2/2013 |
| CN | 104202190 A | 12/2014 |
| CN | 108848415 A | 11/2018 |

OTHER PUBLICATIONS

China Patent Application No. 202011358994.6, second office action, dated Jan. 17, 2022.
(Continued)

*Primary Examiner* — Ranodhi Serrao
(74) *Attorney, Agent, or Firm* — Thomas | Horstemeyer, LLP

(57) ABSTRACT

A method, an apparatus, and a system for time synchronization based on in-band telemetry are disclosed. The method includes: acquiring an estimated value of delay in a first transmission direction and an estimated value of delay in a second transmission direction; wherein the estimated value of delay in the first transmission direction is determined according to multiple delay samples in the first transmission direction, and the estimated value of delay in the second transmission direction is determined according to multiple delay samples in the second transmission direction, the first transmission direction is a direction from a second device to a first device, and the second transmission direction is vice versa; and determining a time system error of the first device relative to the second device according to the estimated value of delay in the first transmission direction and the estimated value of delay in the second transmission direction.

13 Claims, 10 Drawing Sheets

(51) Int. Cl.
*H04L 43/0864* (2022.01)
*H04L 43/0894* (2022.01)

(56) References Cited

U.S. PATENT DOCUMENTS

| | | | |
|---|---|---|---|
| 10,320,691 B1* | 6/2019 | Matthews | H04L 45/24 |
| 2012/0032855 A1* | 2/2012 | Reede | G01S 13/82 |
| | | | 370/252 |
| 2019/0014036 A1* | 1/2019 | Anand | H04J 3/0673 |
| 2020/0021536 A1* | 1/2020 | Kanza | H04L 47/829 |

OTHER PUBLICATIONS

China Patent Application No. 202011358994.6, first office action, dated Jul. 5, 2021.

Hassanien, Aboul Ella, et al., "Big Data in Complex Systems," Studies in Big Data, vol. 9, Springer.

Probability density estimation methods—kernel density estimation and Gaussian mixture distribution.

Hong-Yan, Ma, et al., "Technology Link Delay Algorithm Analysis Based on the NT," Institute of Electronic and Information Engineering, Lanzhou Jiatong University and Information Engineering Institute Longdong University, China Academic Journal Electronic Publishing House.

\* cited by examiner

METHOD, APPARATUS, AND SYSTEM FOR TIME SYNCHRONIZATION BASED ON IN-BAND TELEMETRY

CROSS-REFERENCE TO RELATED APPLICATION

The present application claims priority of Chinese Patent Application No. 202011358994.6, filed to the CNIPA on Nov. 27, 2020 and entitled "Method, Apparatus, and System for Time Synchronization based on In-band Telemetry", the contents of which should be interpreted as being hereby incorporated by reference.

TECHNICAL FIELD

The present disclosure relates to, but is not limited to, the field of computer networks, and in particular to a method, an apparatus, and a system for time synchronization based on in-band telemetry.

BACKGROUND

In recent years, data center network technologies have developed rapidly, but an attention to traffic management and failure monitoring has been lacking for a long time. With rapid expansion of scales of data center networks, a lack of reliable automatic management and operation and maintenance platform brings a great challenge to network management and operation and maintenance.

In traditional networks, a radar detection technology is often used in detection of a forwarding path of a message. However, the radar detection technology requires intervention of controller software. Since there is no hardware support, implementations of a series of design are complicated, and real message forwarding cannot be fully simulated yet.

Although functions of Ping and Tracert can locate a time delay and a path of a network, they are not very accurate methods. In a network with a high requirement for time delay, it is impossible to accurately locate forwarding on which port of which device is the most time-consuming, so it is impossible to optimize an architecture of the network in a targeted manner. The in-band telemetry (INT) technology was born to meet this demand. As an important part of a visualization technology, INT is a first and the most critical step to make network management and operation and maintenance truly automated. With the INT technology, information on each network device on an actual forwarding path of a message, information on input and output ports and a queue of a message on each device, and corresponding time stamp information can be found out.

With the NT technology, information on input and output ports and a queue of each device on a forwarding path of a message, time stamp information of input and output devices, congestion information of a queue and so on can be monitored; and on a last hop of path detection, UDP headers and IP headers of monitored data are encapsulated and sent to a collector. Finally, by using network management software deployed on the collector, the monitored data is analyzed and useful information is extracted.

As shown in FIG. 1, a networking model of network telemetry mainly includes the following parts:

head node (Ingress); a first device in a network of network telemetry, which achieves sampling of a message and mirroring of a message to an INT processor inside the device, and sends the message to an intermediate node after adding an INT message header (including an inherent header and monitoring information meta-data).

intermediate node (Transit): a device except the head node and a tail node in an INT network, which achieves automatic identification of an INT message, adds monitoring information, and sends the message to a downstream node.

tail node (Egress): a device on a last hop in the INT network, which achieves the automatic identification of an INT message, adds monitoring information, performs encapsulation of UDP header and IP header on monitoring information according to a message encapsulation parameter configured by a user, and sends it to a collector.

At present, the INT technology has been defined in an In-band Flow Analyzer draft-kumar-ifa-00 draft of IETF (Internet Engineering Task Force). In the draft, data formats of an inherent header and meta-data (i.e. monitoring information) of an INT message are explained in detail. For a network device supporting the draft, it is theoretically possible to achieve interoperability of INT message analysis and processing.

In an in-band network telemetry technology, there are generally several elements, such as a network device with a function of in-band network telemetry, a centralized data collector, and a controller. There are many reporting modes provided by the network device of network telemetry, including modes of gRPC, INT, ERSPAN and so on. The gRPC (Google remote procedure call) is a high-performance open source software framework based on HTTP 2.0 transport layer protocol issued by Google, which provides a method for configuring and managing a network device that supports multiple programming languages. Both communication parties may carry out secondary development based on this software framework. When a Telemetry technology based on gRPC is adopted, a device automatically reads various statistical information (CPU, memory, interface, etc.), and reports collected information to a collector through gRPC protocol according to a subscription requirement of the collector, thus achieving a more real-time and efficient data collection function compared with a traditional monitoring method. The device supports the following two gRPC interfacing modes:

Dial-in mode: the device serves as a gRPC server and a collector serves as a gRPC client. The collector actively initiates a gRPC connection to the device and subscribes to data information that needs to be collected. The Dial-in mode is suitable for a small-scale network and a scenario where a collector needs to issue configuration to a device.

Dial-out mode: the device acts as a gRPC client and the collector acts as a gRPC server. The device actively establishes a gRPC connection with the collector, and pushes subscription data configured on the device to the collector. The Dial-out mode is suitable for providing device data information to the collector when there are many network devices.

With the INT technology, information of input and output ports and a queue of each device on a forwarding path of a message, time stamp information of input and output devices, congestion information of a queue and so on can be monitored; and on a last hop of path detection, UDP headers and IP headers of monitored data are encapsulated and sent to a collector. Finally, by using network management software deployed on the collector, the monitored data is analyzed and useful information is extracted.

Manufacturers have different solutions for network telemetry, which commonly include INT protocol and IFIT solution from Huawei. The IFIT solution uses SRv6 based on segment routing to carry related information (as shown in FIG. 3). For various solutions, common points are as follows: first, time stamp recording of data packets may be implemented in all of them, data packets are marked with in and out timestamps, and accuracy may generally reach nanosecond level. Secondly, a centralized collector exists in each of them, and may receive corresponding time stamp information. Generally, a collector is a server, which may collect data and perform a subsequent related processing.

SUMMARY

The following is an overview of subject matters described in detail herein. This summary is not intended to limit protection scopes of the claims.

Embodiments of the present disclosure provide a method, an apparatus, and a system of time synchronization based on in-band telemetry, which may avoid bandwidth overhead brought by a time synchronization client and realize network time synchronization with higher accuracy while performing network telemetry.

An embodiment of the present disclosure provides a method for time synchronization based on in-band telemetry, including: acquiring an estimated value of delay in a first transmission direction and an estimated value of delay in a second transmission direction: wherein the estimated value of delay in the first transmission direction is determined according to multiple delay samples in the first transmission direction, and the estimated value of delay in the second transmission direction is determined according to multiple delay samples in the second transmission direction, the first transmission direction is a direction from a second device to a first device, and the second transmission direction is a direction from the first device to the second device; and determining a time system error of the first device relative to the second device according to the estimated value of delay in the first transmission direction and the estimated value of delay in the second transmission direction;

wherein the first device and the second device are both network devices of in-band telemetry.

In some exemplary embodiments, the time system error of the first device relative to the second device is equal to $(\tau-\Delta)/2$, wherein $\tau$ is the estimated value of delay in the first transmission direction and $\Delta$ is the estimated value of delay in the second transmission direction.

In some exemplary embodiments, an estimated value of delay in a transmission direction is determined according to one of the following ways:

determining the estimated value of delay in the transmission direction by using an average method according to multiple delay samples in the transmission direction;

determining the estimated value of delay in the transmission direction by using a median method according to multiple delay samples in the transmission direction;

determining the estimated value of delay in the transmission direction by using a mode method according to multiple delay samples in the transmission direction: and determining the estimated value of delay in the transmission direction by using a probability density estimation method according to multiple delay samples in the transmission direction.

In some exemplary embodiments, determining the estimated value of delay in the transmission direction by using the probability density estimation method according to the multiple delay samples in the transmission direction includes:

fitting a probability density function of the multiple delay samples by using a Gaussian Mixture Model, and determining the estimated value of delay according to the probability density function; or, fitting a probability density function of the multiple delay samples by using a Kernel Density Estimation method, and determining the estimated value of delay according to the probability density function.

In some exemplary embodiments, determining the estimated value of delay in the transmission direction by using the probability density estimation method according to the multiple delay samples in the transmission direction includes:

acquiring a time delay noise of an environment where a destination device in the transmission direction is located;

when the time delay noise is greater than a preset noise threshold, fitting a probability density function of the multiple delay samples in the transmission direction by using a Gaussian Mixture Model, and determining the estimated value of delay in the transmission direction according to the probability density function; and when the delay noise is less than or equal to the preset noise threshold, fitting a probability density function of the multiple delay samples in the transmission direction by using a Kernel Density Estimation method, and determining the estimated value of delay in the transmission direction according to the probability density function:

wherein the destination device includes the first device and the second device.

In some exemplary embodiments, the Gaussian Mixture Model includes multiple Gaussian models optimized through an Expectation-Maximization (EM) algorithm.

In some exemplary embodiments, a kernel function in the Kernel Density Estimation method is a Gaussian kernel function.

In some exemplary embodiments, determining the time system error of the first device relative to the second device according to the estimated value of delay in the first transmission direction and the estimated value of delay in the second transmission direction, includes:

determining, by the first device, the time system error of the first device relative to the second device according to the acquired estimated value of delay in the first transmission direction and estimated value of delay in the second transmission direction: or determining, by a collector, the time system error of the first device relative to the second device according to the acquired estimated value of delay in the first transmission direction and estimated value of delay in the second transmission direction; and issuing, by the collector, the time system error of the first device relative to the second device to the first device.

An embodiment of the present disclosure further provides a system for time synchronization based on in-band telemetry, which includes a first device and a second device;

wherein the first device is configured to acquire an estimated value of delay in a first transmission direction and an estimated value of delay in a second transmission direction;

the first device is further configured to determine a time system error of the first device relative to the second device according to the estimated value of delay in the first transmission direction and the estimated value of delay in the second transmission direction: or the system includes a first device, a second device, and a collector:

wherein the collector is configured to acquire an estimated value of delay in a first transmission direction and an estimated value of delay in a second transmission direction;

the collector is further configured to determine a time system error of the first device relative to the second device according to the estimated value of delay in the first transmission direction and the estimated value of delay in the second transmission direction;

the collector is further configured to issue the determined time system error to the first device;

wherein the estimated value of delay in the first transmission direction is determined according to multiple delay samples in the first transmission direction, and the estimated value of delay in the second transmission direction is determined according to multiple delay samples in the second transmission direction, the first transmission direction is a direction from the second device to the first device, and the second transmission direction is a direction from the first device to the second device;

the first device and the second device are both network devices of in-band telemetry.

An embodiment of the present disclosure further provides an electronic apparatus, which includes a memory and a processor, wherein a computer program for time synchronization is stored in the memory, and the processor is configured to read and run the computer program for time synchronization to perform any one of the above methods of time synchronization based on in-band telemetry.

Other aspects will become apparent after reading and understanding drawings and detailed description.

DETAILED DESCRIPTION

In order to make objects, technical solutions, and advantages of the present invention clearer, the present invention will be further described in detail with reference to drawings and specific embodiments. It should be noted that the embodiments in the present application and features in the embodiments may be combined randomly with each other if there is conflict.

The following step numbers do not limit a specific execution order. According to specific embodiments, an execution order of some steps can be adjusted. It should be noted that the embodiments described here are only for illustration, and are not intended to limit the solutions provided by the present disclosure. In the following description, numerous specific details are set forth in order to provide a thorough understanding of the present invention. However, for those of ordinary skill in the art, it is not necessary to adopt these specific details to implement the solutions of the present disclosure, and related technical solutions known to those of ordinary skill in the art may be adopted to implement related specific details.

Embodiment 1

In a network, network device A (a second device) and network device B (a first device) can time-stamp a selected data packet, and an administrator may decide which data packets may be time-stamped through a centralized controller or by configuring each device separately. A time stamp may be a receiving time stamp, a sending time stamp, or both. Routing devices may be adjacent, or there may be other network devices between the routing devices. A time stamping mechanism is an in-band telemetry mechanism, which may be but not limited to an INT protocol, or an IFIT protocol of Huawei. A typical network is shown in FIG. 4.

In a typical network, other network devices in the network all know an identity of a clock source network device. During time synchronization, if a network device is directly connected with a network device where a clock source is located, it will be synchronized with the clock source first. If there is another network device between the clock source network device and the network device, the network device may choose to synchronize with the clock source or synchronize with another network device between the network device and the clock source. For example, in FIG. 4, network device A will synchronize with a clock source, while network device B may choose to synchronize with either the clock source or network device A.

Figure 1:
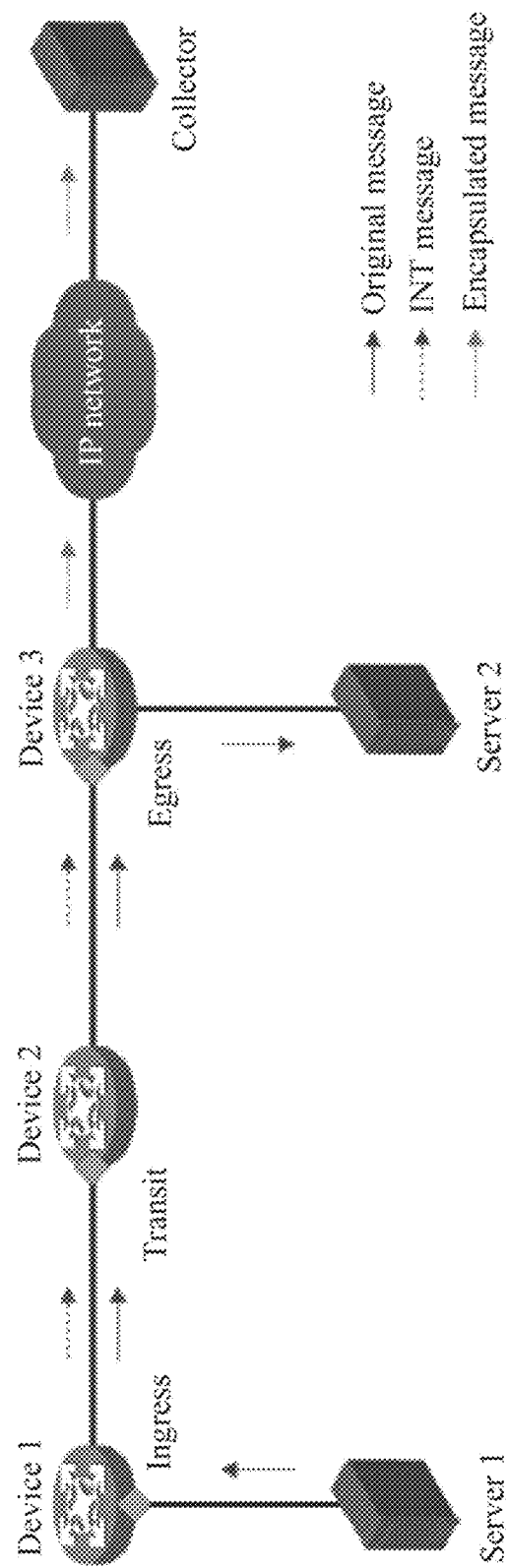
FIG. 1 is a networking model of network telemetry in related art.
Figure 2:
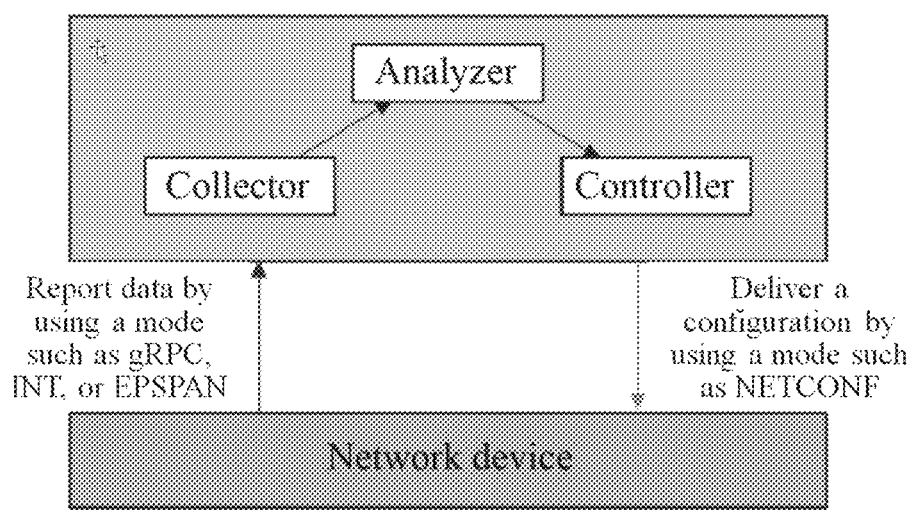
FIG. 2 is a schematic diagram of constituent elements of network telemetry in related art.
Figure 3:
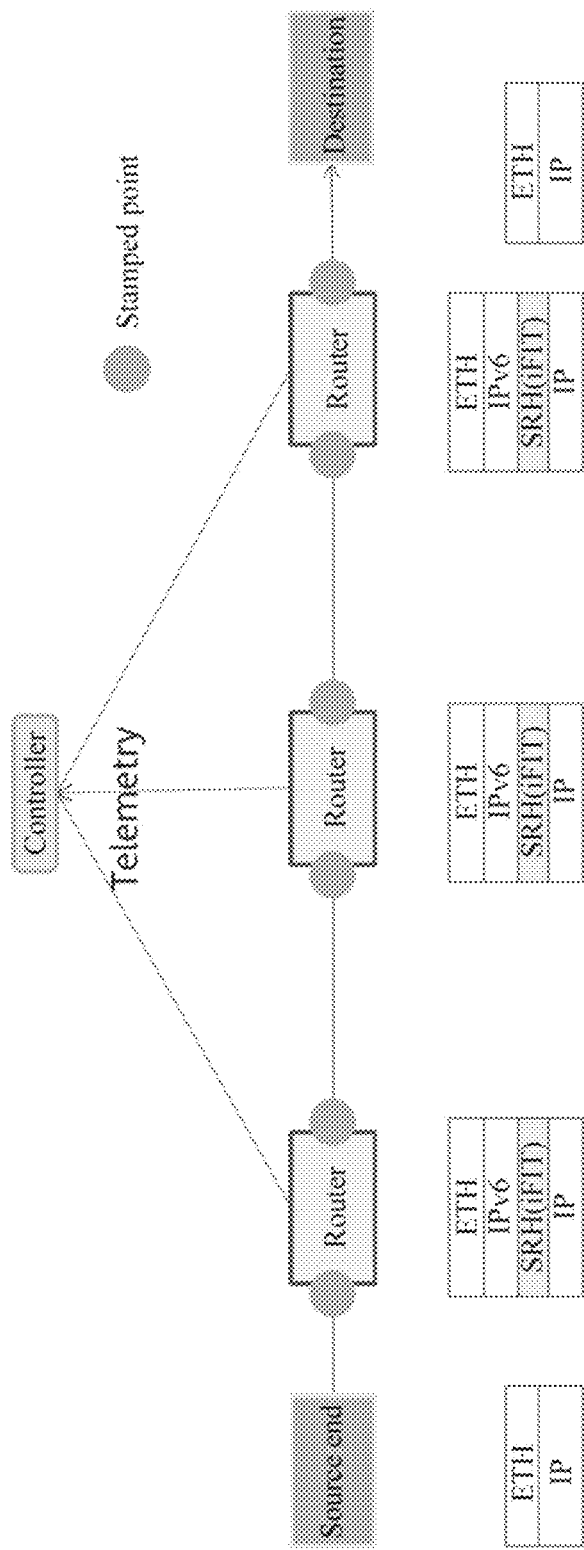
FIG. 3 is a structural schematic diagram of an IFIT protocol in related art.
Figure 4:
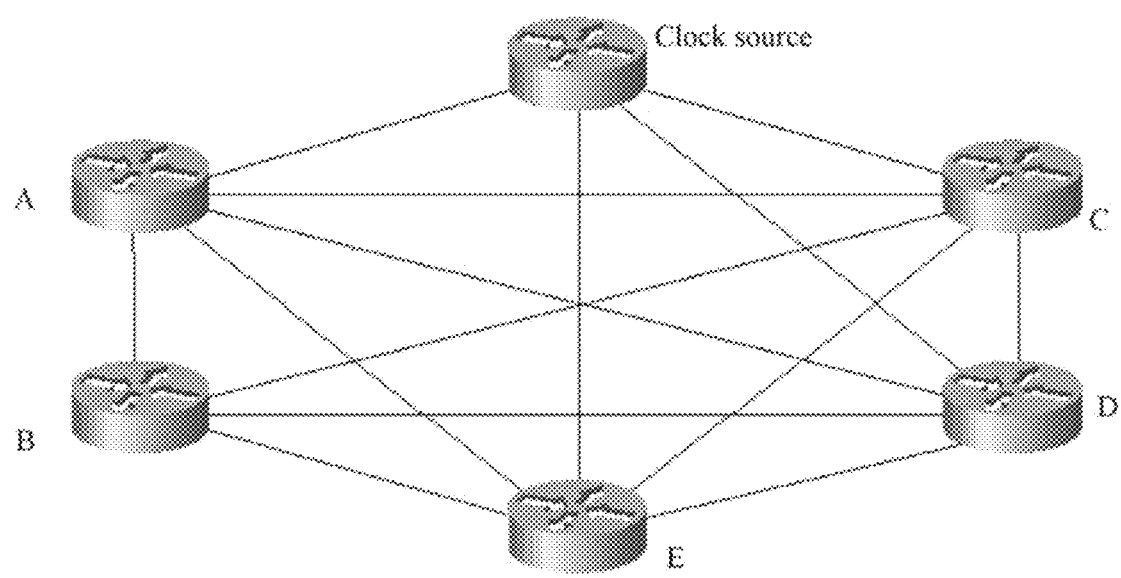
FIG. 4 is a schematic diagram of a typical network structure in an embodiment of the present disclosure.
Figure 5:
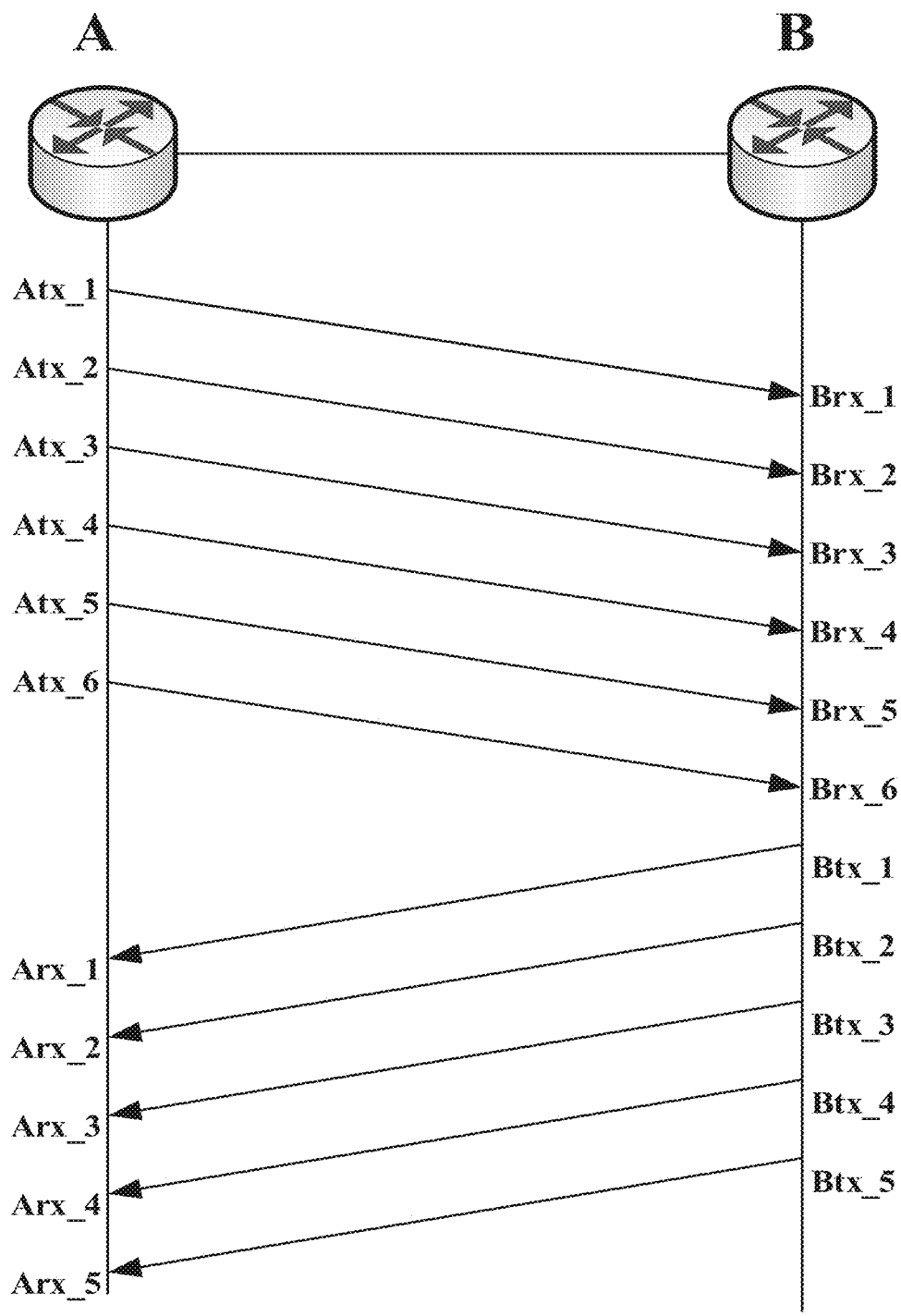
FIG. 5 is a schematic diagram of sending and arriving time of data packets between network devices in an embodiment of the present disclosure.

Taking FIG. 4 as an example, assuming that network device B (the first device) needs to synchronize with network device A (the second device), and through in-band network telemetry technology, network device B will get several time stamp samples about network device A in each period of time, as shown in FIG. 5. These are N time-stamped data packets from network device A, wherein $Atx\_1, Atx\_2, \ldots, Atx\_N$ are time information (timestamps) of data packets sent by network device A. The network device B obtains corresponding one-way delays $\tau 1 = Brx\_1 - Atx\_1$, $\tau 2 = Brx\_2 - Atx\_2$, $\ldots$, $\tau N = Brx\_N - Atx\_N$, according to its own time information (time information of the N data packets received) $Brx\_1, Brx\_2 \ldots, Brx\_N$ and timestamps obtained by each data packet, and from these values, a final one-way time delay estimation from A to B, $\tau = T_{A-B}$, which is also called an estimated value of delay in a first transmission direction, may be obtained. In the same way, several time stamp samples about network device B may be obtained on network device A, and these are M time-stamped data packets from network device B, wherein $Btx\_1, Btx\_2, \ldots, Btx\_M$ are time information (timestamps) of data packets sent by network device B. Network device A obtains corresponding one-way delays $\Delta 1 = Arx\_1 - Btx\_1$, $\Delta 2 = Arx\_2 - Btx\_2$, $\ldots$, $\Delta M = Arx\_M -$ Btx_M according to its own time information (time information of the M data packets received) Arx_1, Arx 2, . . . , Arx_M and timestamps obtained by each data packet. At last, $\Delta=T_{B-A}$, which is also called an estimated value of delay in a second transmission direction, is obtained.

In network telemetry, network device B may get Brx_1-Atx_1, Brx_2-Atx_2, . . . , Brx_N-Atx_N, but receiving time Arx_1, Arx_2, . . . , Arx_M of the data packets of network device A cannot be directly obtained. To this end, it needs to be obtained through an interface of network telemetry. These methods include: using a dial-in mode of gRPC to directly query the network device A; or, querying through an interface provided by a collector. According to a position where an estimated value is obtained, it may be divided into two situations, and specific flows thereof are shown in FIG. 6 and FIG. 7.

Figure 6:
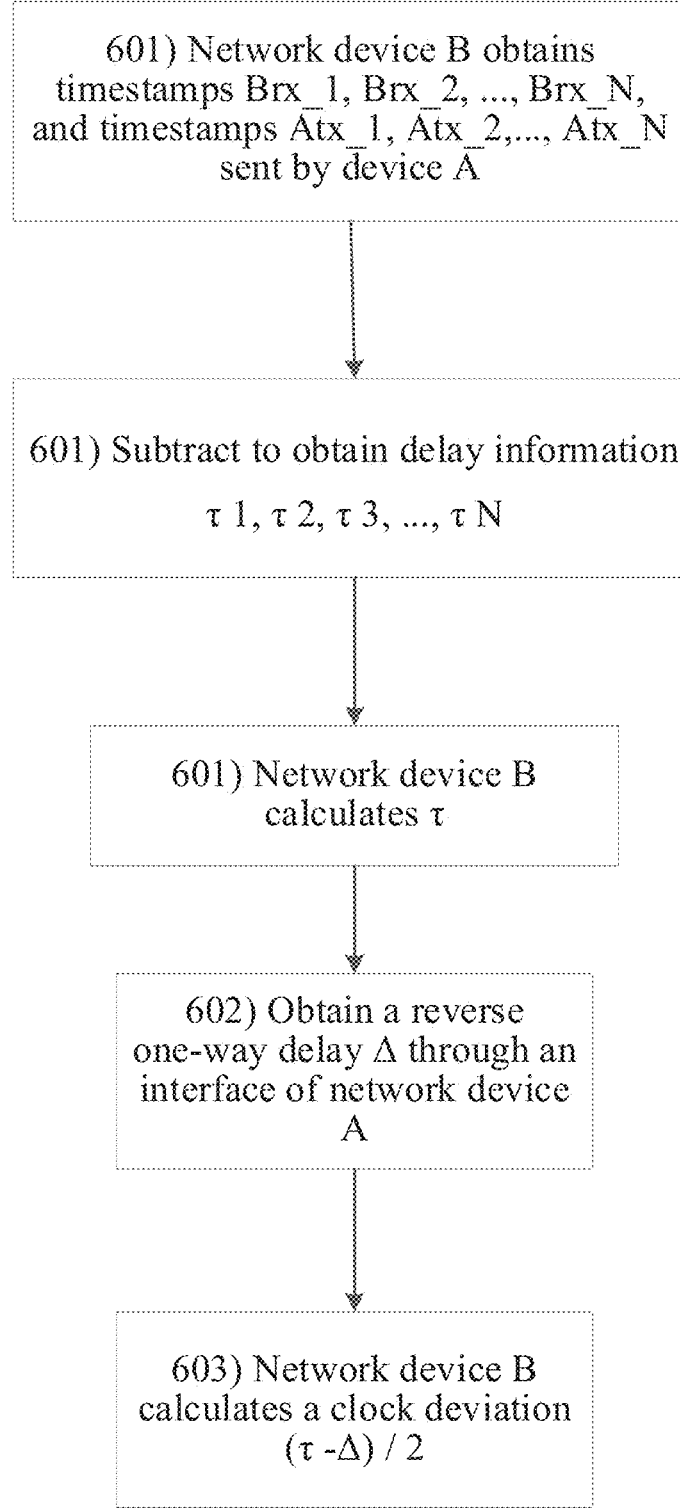
FIG. 6 is a flowchart of time synchronization in an embodiment of the present disclosure.
Figure 7:
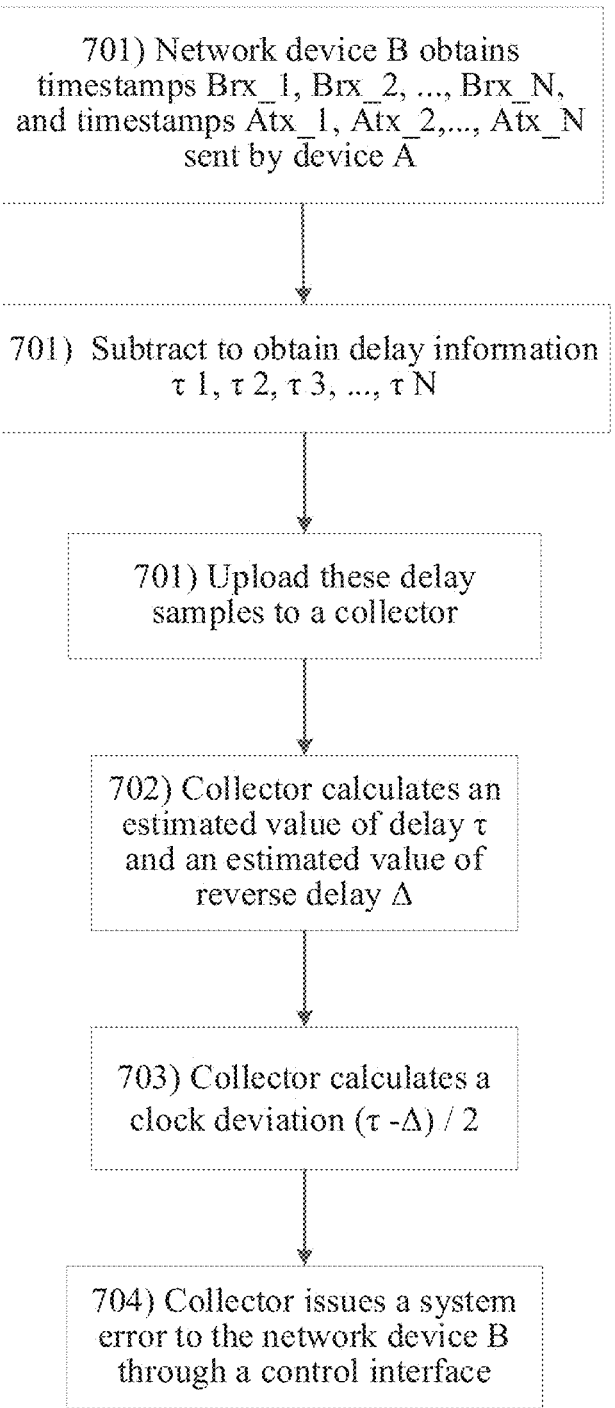
FIG. 7 is a flowchart of time synchronization in another embodiment of the present disclosure.

In some exemplary embodiments, a flow of a method for time synchronization based on in-band telemetry is shown in FIG. 6, including:

601) network device B and network device A respectively obtain corresponding estimated value $\tau$ of $T_{A-B}$ (an estimated value of delay in a first transmission direction) and estimated value $\Delta$ of $T_{B-A}$ (an estimated value of delay in a second transmission direction) according to obtained one-way delay samples;

602) the network device B requests the network device A to obtain the estimated value $\Delta$ of $T_{B-A}$; and 603) the network device B calculates a time system error $(\tau-\Delta)/2$ of the network device B relative to the network device A.

In some exemplary embodiments, a flow of a method for time synchronization based on in-band telemetry is shown in FIG. 7, including:

701) network device B and network device A respectively upload obtained one-way delay samples to a collector;

702) the collector obtains corresponding estimated value $\tau$ of $T_{A-B}$ (an estimated value of delay in a first transmission direction) and estimated value $\Delta$ of $T_{B-A}$ (an estimated value of delay in a second transmission direction) according to the obtained one-way delay samples;

703) the collector calculates a time system error $(\tau-\Delta)/2$ of B relative to A; and 704) the collector issues the system error to the network device B through a control interface.

In some exemplary embodiments, taking a first transmission direction (a direction from network device A to network device B) as an example, determining an estimated value of delay $\tau$ in this direction includes:

in a sample set composed of multiple one-way delays $\tau1$, $\tau2$, $\tau3$, . . . , $\tau N$, there are many corresponding algorithms to obtain estimated values. $\tau1=Brx\_1-Atx\_1$, $\tau2=Brx\_2-Atx\_2$, . . . , $\tau N=Brx\_N-Atx\_N$.

In some exemplary embodiments, an actual one-way delay $\tau=(\tau1+\tau2+ . . . +\tau N)/N$ may be estimated using an average value of multiple one-way delays.

In some exemplary embodiments, median and mode may also be used for estimation. A median is a representative value in a middle position of a group of data, and its characteristic is that it is not affected by an extreme value of the data. For data with a skewed distribution, representativeness of median is better than that of average. In a group of ordered data, if the number of data is odd, a median value is a middle number. If the number of data is even, a median is an average of two middle values.

In some exemplary embodiments, when a distribution of data has an obvious Central tendency, especially for a skewed distribution, representativeness of mode is better than that of average. A probability density estimation method is used to estimate a probability density distribution of a group of data sets, and is divided into a parametric estimation method and a nonparametric estimation method.

In some exemplary embodiments, a probability density estimation method may be used to determine a corresponding estimated value of delay according to multiple delay samples.

In some exemplary embodiments, a probability density estimation method used to determine a corresponding estimated value of delay, includes a parameter estimation method and a nonparametric estimation method.

In some exemplary embodiments, for a parameter estimation method: Gaussian Mixture Model:

Assuming that a sample set conforms to a certain probability distribution, and then parameters in the distribution is fitted according to the sample set, such as maximum likelihood estimation, Gaussian mixture. Since subjective prior knowledge needs to be incorporated into the parameter estimation method, it is often difficult to fit a model with a real distribution.

For a nonparametric estimation method: Kernel Density Estimation method:

Any prior knowledge does not need to be incorporated into the nonparametric estimation, instead, a distribution is fitted according to characteristics and properties of data itself, thus a better model can be obtained compared with a parameter estimation method. For example, Kernel Density Estimation is one of nonparametric estimations.

In some exemplary embodiments, assuming that a Gaussian Mixture Model consists of K Gaussian models (i.e., data contains K classes), a probability density function of the Gaussian Mixture Model (GMM) is as follows:

$$p(x) = \sum_{k=1}^{K} p(k)p(x|k) = \sum_{k=1}^{K} \pi_k N(x|\mu_k, \sum_k)$$

where $p(x|k)=N(x|\mu_k, \Sigma_k)$ is a probability density function of the k-th Gaussian model, which may be regarded as a probability that the k-th model produces x after the k-th model is selected. $p(k)=\pi_k$ is a weight of the k-th Gaussian model, which is called a prior probability of selecting the k-th model and satisfies $$\sum_{k=1}^{K} \pi_k = 1.$$

In this embodiment, x represents one-way time delay data $\tau$.

Figure 8:
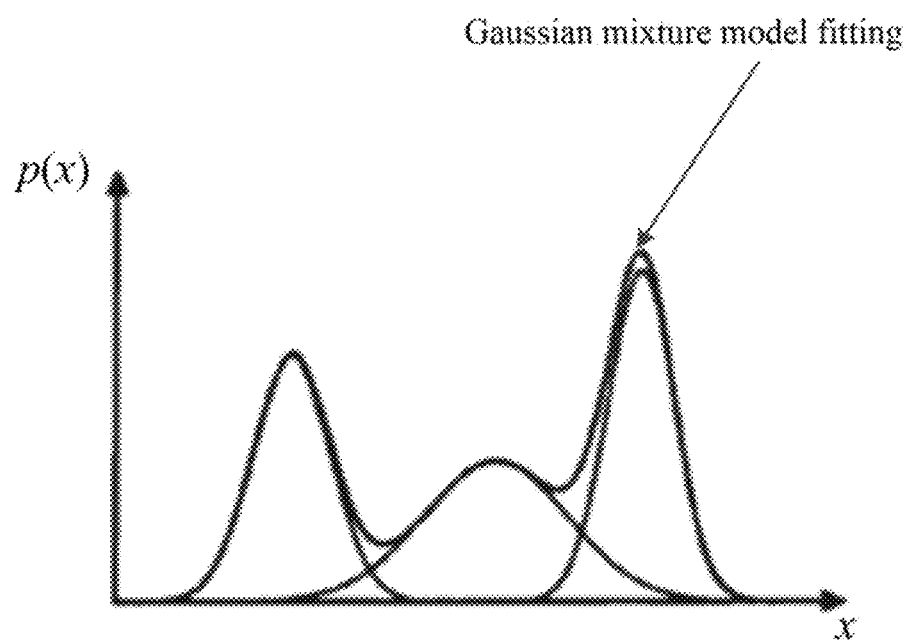
FIG. 8 is a schematic diagram of fitting probability density through a Gaussian Mixture Model in one embodiment of the present disclosure.

It should be understood by those skilled in the art that a Gaussian Mixture Model is fusion of multiple single Gaussian models in essence, which makes a model more complex and thus produces more complex samples. Theoretically, if there are enough Gaussian models fused by a certain Gaussian Mixture Model, and weights among them are set reasonably enough, the mixture model may fit samples with any distribution. A schematic diagram of fitting by the mixture model is shown in FIG. 8. It may be understood by those of ordinary skills that the uppermost curve in FIG. 8 is a curve fitted by a Gaussian Mixture Model, and the following three curves are curves corresponding to three single Gaussian models, which are single Gaussian distribution curves satisfying different parameter combinations (such as a combination of mean and variance).

Taking the k-th Gaussian model as an example, for parameters $\pi_k$, $\mu_k$, $\Sigma_k$ of the k-th Gaussian model in a Gaussian Mixture Model, an Expectation-Maximization (EM) algorithm is used for optimization. The EM algorithm may be used to solve a parameter estimation problem of data missing (existence of a hidden variable is actually a problem of missing data, which kind of record each sample comes from is missing). The EM algorithm is divided into two steps. A first step is to find a rough value of a parameter to be estimated, and a second step is to maximize a likelihood function by using the value of the first step.

In some exemplary embodiments, steps of the algorithm are as follows.

1. Defining a component k, i.e., k=1, 2 . . . , K, where K represents the number of Gaussian models, setting initial values of $\pi_k$, $\mu_k$, $\Sigma_k$ for each component k, and calculating a log likelihood function of formula (1). In this embodiment, $\pi_k$, $\mu_k$, $\Sigma_k$ respectively represents a weight, a mean, and a variance of the k-th Gaussian distribution.

$$p(x \mid \pi, \mu, \Sigma) = \sum_{k=1}^{K} \pi_k N(x \mid \mu_k, \Sigma_k) \quad (1)$$

2. Executing E-step: according to current $\pi_k$, $\mu_k$, $\Sigma_k$, posterior probabilities $\gamma(z_{nk})$ are calculated, wherein $\gamma(z_{nk})$ indicates a sampling point n, that is, a posterior probability that the single time delay $\tau n$ belongs to the k-th Gaussian distribution.

$$\gamma(z_{nk}) = \frac{\pi_k N(x_n \mid \mu_n, \Sigma_n)}{\sum_{j=1}^{K} \pi_j N(x_n \mid \mu_j, \Sigma_j)}$$

3. Executing M-step: according to $\gamma(z_{nk})$ calculated in E-step, calculating new $\pi_k$, $\mu_k$, $\Sigma_k$.

$$\mu_k^{new} = \frac{1}{N_k} \sum_{n=1}^{N} \gamma(z_{nk}) x_n$$

$$\sum_{k}^{new} = \frac{1}{N} \sum_{n=1}^{N} \gamma(z_{nk})(x_n - \mu_k^{new})(x_n - \mu_k^{new})^T$$

$$\pi_k^{new} = \frac{N_k}{N}$$

wherein, $$N_k = \sum_{n=1}^{N} \gamma(z_{nk})$$

N represents the number of sampling points, that is, a size of data set of one-way time delays in this embodiment.

4. Calculating a log likelihood function of formula (1)

$$\ln p(x \mid \pi, \mu, \Sigma) = \sum_{n=1}^{N} \ln \left\{ \sum_{k=1}^{K} \pi_k N(x_k \mid \mu_k, \Sigma_k) \right\}$$

Checking whether the parameters converge or whether the log likelihood function converges. If not, returning to step 2. That is, after checking convergence of the parameters or the function, parameters $\pi_k$, $\mu_k$, $\Sigma_k$ of each single Gaussian model are determined, and a probability density function of the Mixture model may be obtained by substituting these calculated parameters back to p(x).

That is, by using the Gaussian Mixture Model, a probability density function of the sample set composed of multiple one-way delays $\tau 1$, $\tau 2$, $\tau 3$, . . . , $\tau N$ is obtained through fitting, and then the estimated value of delay is determined according to the probability density function.

In some exemplary embodiments, an abscissa of a point on the Gaussian Mixture Model curve is selected as an estimated value of delay; or, an average value of abscissas of multiple peaks on the curve is selected as an estimated value of time delay; or, an abscissa of the highest peak point on the curve may be selected as an estimated value of time delay. Those skilled in the art may make a selection according to situations, which are not limited to specific ways exemplified here.

A Kernel Density Estimation (KDE) method is used to estimate an unknown density function in the probability theory, which is one of nonparametric test methods. In the KDE method, prior knowledge about data distribution is not used and any assumption to data distribution is not attached. The KDE method is a method to study characteristics of data distribution from data samples, and has been highly valued in both statistical theory and application fields. Kernel density estimation is not to find a real distribution function. It takes data+bandwidth of each data point as a parameter of a kernel function through the kernel function (such as Gaussian), and then obtains N kernel functions, which are linearly superimposed to form a Kernel Density Estimation function, which becomes a Kernel Density probability density function after normalization. Therefore, core steps of an algorithm principle of Kernel Density Estimation are described as follows:

1. each vicinity of observation is approximated by using a normal distribution curve:
2. normal distribution curves of all observations are superimposed; and
3. a normalized bandwidth parameter is used to approximate a width of a normal distribution curve.

Here, "observation" may be understood as multiple pieces of one-way time delay data $\tau i$ at the same sampling point, and the vicinity of observation refers to a minimal range of a time delay data result, and a complete normal distribution curve may be obtained by carrying out normal distribution approximation and superposition on each minimal range.

Figure 9:
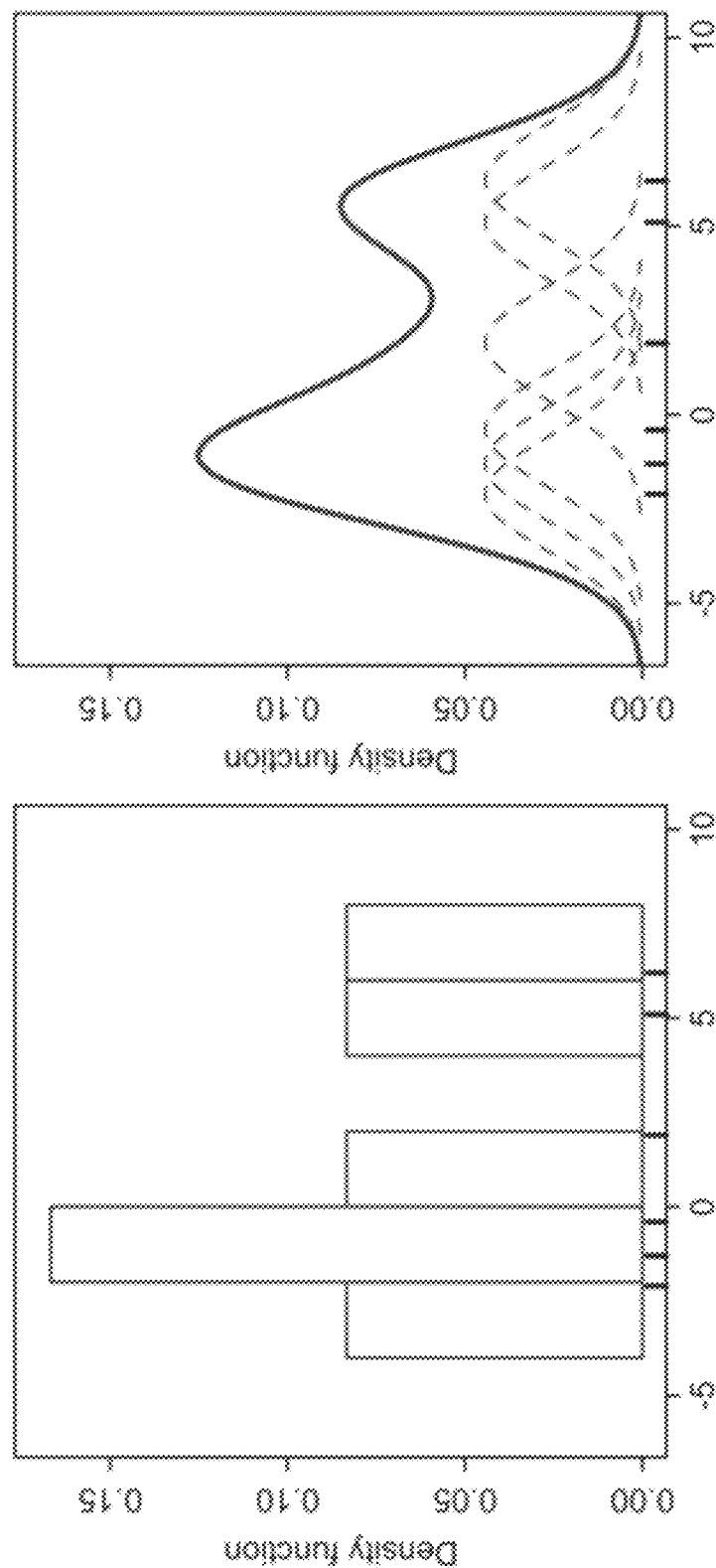
FIG. 9 is a schematic diagram of fitting probability density through a Kernel Density Estimation method in one embodiment of the present disclosure.

In some exemplary embodiments, a Kernel Density Estimation method is used to determine a corresponding estimated value of delay, including:

Assuming that a data set of one-way time delays contains N samples $\{\tau 1, \tau 2, \tau 3, \ldots, \tau N\}$, and a probability density function of the whole sample set may be obtained by fitting these N samples with a kernel function and performing superposition on these N probability density functions, then an abscissa of a peak point is an estimated one-way time delay τ. The fitting and superposition process is shown in FIG. 9. In this example a rectangular distribution on the left may represent a probability distribution of different one-way time delay values, the right figure is another representation of a the left figure with the same meaning, and a top curve on the right figure represents a final fitting curve of data distribution obtained through a Kernel Density Estimation method.

A pseudo-code description of an algorithm of Kernel Density Estimation (KDE) refers to Algorithm 1.

---

Algorithm 1. Kernel Density Estimation (KDE) method

---

Input: one-way time delay data τ1, τ2, τ3, ..., τN
Output: an estimated one-way time delay τ
1. Selecting a kernel function and a bandwidth: kernel='gau', bw='scott'
2. Creating a new KDE_FIT object and substituting it into a data set of one-way time delay to fit kde.fit ( )
3. Calculating values of kdefit_x and kdefit_y of a KDE curve
4. IF kdefit_y == max(kdefit_y), do
5.     point = max(kdefit_y)
6.         RETURN point. kdefit_x
7. ELSE
8.         RETURN NULL
9. END

---

In some exemplary embodiments, the kde.fit fitting includes using a kde.fit function (a function) in a Python third-party function library statamnodels. This function is a main method for data fitting, and a KDE approximate fitting curve of a distribution of a data set is obtained. An example is as follows:

statsmodels.nonparametric.api.KDEUnivariate(Data).fit (self, kemel="gau", bw="scott", M=True, weights=None, gridsize=None, adjust=1, cut=3, clip=(-np.inf, np.inf));

wherein gau represents a Gaussian kernel function.

In some exemplary embodiments, a kernel function that may be referred further includes: {'cos'|'biw'|'epa'|'tri'|'triw'}; when a bandwidth is the best choice, Kernel Density Estimation is not sensitive to selection of a kernel function, and another kernel function may be adopted to achieve a similar technical effect.

That is, by using the Kernel Density Estimation method, a probability density function of the sample set composed of multiple one-way delays τ1, τ2, τ3, . . . , τN is obtained through fitting, and then the estimated value of delay is determined according to the probability density function.

Kernel Density Estimation adopts a single model, which leads to a noise in sampled samples, causing many noisy points a final result, and details such as contour edge processing are too rough. However, a Gaussian Mixture Model establishes multiple Gaussian distributions for each pixel, which can describe characteristics of data more accurately, but the computation is heavy and a the algorithm is complex. In some exemplary embodiments, when measuring and estimating one-way time delay, it is determined whether there is a large time delay noise according to an environment where a current network node is located. If the noise is small, a Kernel Density Estimation algorithm may be directly selected, and if the noise is large, a Gaussian Mixture Model algorithm may be selected.

In some exemplary embodiments, for the network device B, time delay noise of an environment where the network device B is located is obtained, and when the time delay noise is greater than a preset noise threshold, a Gaussian Mixture Model is used to fit multiple one-way time delay samples in the first transmission direction (the direction from the network device A to the network device B) to determine a probability density function. When the time delay noise is less than or equal to the preset noise threshold, a Kernel Density Estimation method is used to fit multiple one-way time delay samples in the first transmission direction to determine a probability density function.

Time delay noise usually refers to data with an error or anomaly (deviating from an expected value) in multiple delay sample data sets, which may cause interference to a subsequent analysis. In some exemplary embodiments, a data deviation threshold is defined, and if a certain sample value in a delay sample data set is greater than the threshold, then the sample data is time delay noise. Assuming that time delay is generally within 0.1s, if time delay of a certain measurement is greater than 0.1 s, then the time delay is noise. A reasonable value of the threshold usually needs to be selected according to human judgment of an actual environment.

In some exemplary embodiments, an estimated value of delay A in the second transmission direction (the direction from network device B to network device A) is determined in a similar way as an estimated value of delay τ in a first transmission direction, and will not be described in detail here.

Embodiment 2

Figure 10:
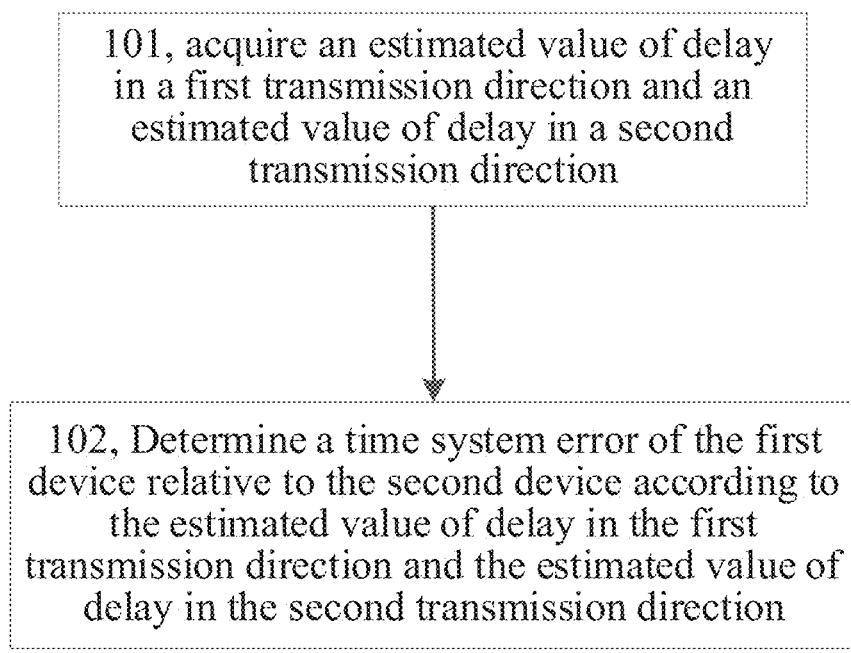
FIG. 10 is a flowchart of time synchronization based on in-band telemetry in another embodiment of the present disclosure.

An embodiment of the present disclosure further provides a method for time synchronization based on in-band telemetry, a flow of the method is shown in FIG. 10, including following steps.

Step 101, acquiring an estimated value of delay in a first transmission direction and an estimated value of delay in a second transmission direction.

Step 102, determining a time system error of a first device relative to a second device according to the estimated value of delay in the first transmission direction and the estimated value of delay in the second transmission direction.

The estimated value of delay in the first transmission direction is determined according to multiple delay samples in the first transmission direction, and the estimated value of delay in the second transmission direction is determined according to multiple delay samples in the second transmission direction.

The first transmission direction is a direction from a second device to the first device, and the second transmission direction is a direction from the first device to the second device.

The first device and the second device are both network devices of in-band telemetry.

In some exemplary embodiments, the time system error of the first device relative to the second device is equal to (τ−Δ)/2:

wherein τ is the estimated value of delay in the first transmission direction and Δ is the estimated value of delay in the second transmission direction.

In some exemplary embodiments, an estimated value of delay in a transmission direction is determined according to one of the following ways.

According to multiple delay samples in the transmission direction, an average method is used to determine the estimated value of delay in the transmission direction.

According to multiple delay samples in the transmission direction, a median method is used to determine the estimated value of delay in the transmission direction.

According to multiple delay samples in the transmission direction, a mode method is used to determine the estimated value of delay in the transmission direction.

According to multiple delay samples in the transmission direction, a probability density estimation method is used to determine the estimated value of delay in the transmission direction.

In some exemplary embodiments, according to the multiple delay samples in the transmission direction, determining the estimated value of delay in the transmission direction by using the probability density estimation method includes:

fitting a probability density function of the multiple delay samples by using a Gaussian Mixture Model, and determining the estimated value of delay according to the probability density function, or, fitting a probability density function of the multiple delay samples by using a Kernel Density Estimation method, and determining the estimated value of delay according to the probability density function.

In some exemplary embodiments, according to the multiple delay samples in the transmission direction, determining the estimated value of delay in the transmission direction by using the probability density estimation method includes:

acquiring time delay noise of an environment where a destination device in the transmission direction is located;

when the time delay noise is greater than a preset noise threshold, fitting a probability density function of the multiple delay samples in the transmission direction by using a Gaussian Mixture Model, and determining the estimated value of delay in the transmission direction according to the probability density function; and when the delay noise is less than or equal to the preset noise threshold, fitting a probability density function of the multiple delay samples in the transmission direction by using a Kernel Density Estimation method, and determining the estimated value of delay in the transmission direction according to the probability density function;

wherein the destination device includes the first device and the second device.

In some exemplary embodiments, the Gaussian Mixture Model includes multiple Gaussian models optimized through the Expectation-Maximization (EM) algorithm.

In some exemplary embodiments, assuming that a Gaussian Mixture Model consists of K Gaussian models (i.e., data contains K classes), a probability density function of the Gaussian Mixture Model (GMM) is as follows:

$$p(x) = \sum_{k=1}^{K} p(k)p(x \mid k) = \sum_{k=1}^{K} \pi_k N\left(x \mid \mu_k, \sum_k\right)$$

where $p(x|k)=N(x|\mu_k, \Sigma_k)$ is a probability density function of the k-th Gaussian model, which may be regarded as a probability that the k-th model produces x after the k-th model is selected. $p(k)=\pi_k$ is a weight of the k-th Gaussian model, which is called a prior probability of selecting the k-th model and satisfies $$\sum_{k=1}^{K} \pi_k = 1.$$

In this embodiment, x represents one-way time delay data $\tau$.

Taking the k-th Gaussian model as an example, for parameters $\pi_k$, $\mu_k$, $\Sigma_k$ of the k-th Gaussian model in the Gaussian Mixture Model, an Expectation-Maximization (EM) algorithm is used for optimization. The EM algorithm may be used to solve a parameter estimation problem of data missing (existence of a hidden variable is actually a problem of missing data, which kind of record each sample comes from is missing). The EM algorithm is divided into two steps. A first step is to find a rough value of a parameter to be estimated, and a second step is to maximize a likelihood function by using the value of the first step. Related specific steps may refer to the descriptions in Embodiment 1, which will not be repeated here.

In some exemplary embodiments, a kernel function in the Kernel Density Estimation method is a Gaussian kernel function.

In some exemplary embodiments, a kernel function in the Kernel Density Estimation method further includes one of the following functions: cos, biw, epa, tri, and triw. Further detailed steps of fitting and obtaining a probability density function of multiple delay samples by using a Kernel Density Estimation method may refer to the descriptions in Embodiment 1, which will not be repeated here.

In some exemplary embodiments, determining the time system error of the first device relative to the second device according to the estimated value of delay in the first transmission direction and the estimated value of delay in the second transmission direction includes:

determining, by the first device, the time system error of the first device relative to the second device according to the obtained estimated value of delay in the first transmission direction and the estimated value of delay in the second transmission direction; or, determining, by a collector, the time system error of the first device relative to the second device according to the obtained estimated value of delay in the first transmission direction and the estimated value of delay in the second transmission direction; and issuing, by the collector, the time system error of the first device relative to the second device to the first device.

Embodiment 3

An embodiment of the present disclosure further provides an apparatus for time synchronization based on in-band telemetry, including:

a delay estimation module 1101, configured to acquire an estimated value of delay in a first transmission direction and an estimated value of delay in a second transmission direction; and a time system error determination module 1102, configured to determine a time system error of a first device relative to a second device according to the estimated value of delay in the first transmission direction and the estimated value of delay in the second transmission direction.

The estimated value of delay in the first transmission direction is determined according to multiple delay samples in the first transmission direction, and the estimated value of delay in the second transmission direction is determined according to multiple delay samples in the second transmission direction.

The first transmission direction is a direction from a second device to a first device, and the second transmission direction is a direction from the first device to the second device.

The first device and the second device are both network devices of in-band telemetry.

Embodiment 4

An embodiment of the present disclosure further provides a system for time synchronization based on in-band telemetry, including:

a first device and a second device.

The first device is configured to acquire an estimated value of delay in a first transmission direction and an estimated value of delay in a second transmission direction.

The first device is further configured to determine a time system error of the first device relative to the second device according to the estimated value of delay in the first transmission direction and the estimated value of delay in the second transmission direction.

The estimated value of delay in the first transmission direction is determined according to multiple delay samples in the first transmission direction, and the estimated value of delay in the second transmission direction is determined according to multiple delay samples in the second transmission direction. The first transmission direction is a direction from the second device to the first device, and the second transmission direction is a direction from the first device to the second device.

The first device and the second device are both network devices of in-band telemetry.

In some exemplary embodiments, the first device acquiring the estimated value of delay in the first transmission direction includes: the first device determines the estimated value of delay in the first transmission direction according to multiple delay samples in the first transmission direction.

The first device acquiring the estimated value of delay in the second transmission direction includes; the first device acquires the estimated value of delay in the second transmission direction from the second device, wherein the estimated value of delay in the second transmission direction is determined by the second device according to multiple delay samples in the second transmission direction.

Embodiment 5

An embodiment of the present disclosure further provides a system for time synchronization based on in-band telemetry, including: a first device, a second device, and a collector.

The collector is configured to acquire an estimated value of delay in a first transmission direction and an estimated value of delay in a second transmission direction.

The collector is further configured to determine a time system error of the first device relative to the second device according to the estimated value of delay in the first transmission direction and the estimated value of delay in the second transmission direction.

The collector is further configured to issue the determined time system error to the first device.

The estimated value of delay in the first transmission direction is determined according to multiple delay samples in the first transmission direction, and the estimated value of delay in the second transmission direction is determined according to multiple delay samples in the second transmission direction. The first transmission direction is a direction from the second device to the first device, and the second transmission direction is a direction from the first device to the second device.

The first device and the second device are both network devices of in-band telemetry.

In some exemplary embodiments, the collector acquiring the estimated value of delay in the first transmission direction includes: the collector acquires the estimated value of delay in the first transmission direction from the first device. The estimated delay value in the first transmission direction is determined by the first device according to multiple delay samples in the first transmission direction.

The collector acquiring the estimated value of delay in the second transmission direction includes: the collector acquires the estimated value of delay in the second transmission direction from the second device. The estimated value of delay in the second transmission direction is determined by the second device according to multiple delay samples in the second transmission direction.

In some exemplary embodiments, the collector acquiring the estimated value of delay in the first transmission direction includes: the collector acquires multiple delay samples in the first transmission direction and determines the estimated value of delay in the first transmission direction according to the multiple delay samples in the first transmission direction.

The collector acquiring the estimated value of delay in the second transmission direction includes: the collector acquiring multiple delay samples in the second transmission direction and determines the estimated value of delay in the second transmission direction according to the multiple delay samples in the second transmission direction.

An embodiment of the present disclosure further provides an electronic apparatus, which includes a memory and a processor. The a computer program for time synchronization is stored in the memory, and the processor is configured to read and run the computer program for time synchronization to perform any one of the above methods for time synchronization.

An embodiment of the present disclosure further provides a storage medium, in which a computer program is stored. The computer program is configured such that when the computer program is run, any one of the above methods for time synchronization methods is performed.

According to the solution of time synchronization provided by the present disclosure, time synchronization is performed based on network telemetry, so that bandwidth overhead brought by a time synchronization client is avoided, and network time synchronization with higher accuracy is achieved while network telemetry is performed. This solution may be implemented on a network infrastructure such as a router and a switch.

It may be understood by those skilled in the art that all or some of the steps in the methods, and functional modules/units in the systems and apparatuses disclosed above may be implemented as a software, a firmware, a hardware, and an appropriate combination thereof. In a hardware implementation, a division between functional modules/units mentioned in the above description does not necessarily correspond to a division of physical components: For example, a physical component may have multiple functions, or a function or step may be cooperatively performed by several physical components. Some or all of the components may be implemented as software executed by a processor, such as a digital signal processor or a microprocessor, or as hardware, or as an integrated circuit, such as an application specific integrated Circuit. Such software may be distributed on a computer-readable medium, which may include a computer storage medium (or a non-transitory medium) and a communication medium (or a transitory medium). As well known to those of ordinary skill in the art, the term computer storage medium includes a volatile, nonvolatile, removable, and non-removable medium implemented in any method or technology for storing information (such as computer readable instructions, a data structure, a program module, or other data). A computer storage medium includes but is not limited to a RAM, a ROM, an EEPROM, a flash memory, or another memory technology, a CD-ROM, a Digital Versatile Disk (DVD), or another optical disk storage, a magnetic box, a magnetic tape, a magnetic disk storage, or another magnetic storage apparatus, or any other medium that may be used to store desired information and may be accessed by a computer. Furthermore, it is well known to those of ordinary skill in the art that a communication medium typically contains computer readable instructions, a data structure, a program module, or other data in a modulated data signal such as a carrier wave or another transmission mechanism, and may include any information delivery medium.

What is claimed is:

1. A method for time synchronization based on in-band telemetry, comprising:
    acquiring an estimated value of delay in a first transmission direction and an estimated value of delay in a second transmission direction; wherein the estimated value of delay in the first transmission direction is determined according to a plurality of delay samples in the first transmission direction, and the estimated value of delay in the second transmission direction is determined according to a plurality of delay samples in the second transmission direction; the first transmission direction is a direction from a second device to a first device, and the second transmission direction is a direction from the first device to the second device; and
    determining a time system error of the first device relative to the second device according to the estimated value of delay in the first transmission direction and the estimated value of delay in the second transmission direction;
    wherein the first device and the second device are both network devices of in-band telemetry;
    wherein an estimated value of delay in a transmission direction is determined according to the following way:
    determining the estimated value of delay in the transmission direction by using a probability density estimation method according to a plurality of delay samples in the transmission direction;
    wherein determining the estimated value of delay in the transmission direction by using the probability density estimation method according to the plurality of delay samples in the transmission direction comprises:
    fitting a probability density function of the plurality of delay samples by using a Gaussian Mixture Model, and determining the estimated value of delay according to the probability density function; or
    fitting a probability density function of the plurality of delay samples by using a Kernel Density Estimation method, and determining the estimated value of delay according to the probability density function.

2. The method of claim 1,
    wherein the time system error of the first device relative to the second device is equal to $(\tau-\Delta)/2$;
    wherein $\tau$ is the estimated value of delay in the first transmission direction and $\Delta$ is the estimated value of delay in the second transmission direction.

3. The method of claim 2,
    wherein determining the estimated value of delay in the transmission direction by using the probability density estimation method according to the plurality of delay samples in the transmission direction comprises:
    acquiring time delay noise of an environment where a destination device in the transmission direction is located;
    when the time delay noise is greater than a preset noise threshold, fitting a probability density function of the plurality of delay samples in the transmission direction by using a Gaussian Mixture Model, and determining the estimated value of delay in the transmission direction according to the probability density function; and
    when the delay noise is less than or equal to the preset noise threshold, fitting a probability density function of the plurality of delay samples in the transmission direction by using a Kernel Density Estimation method, and determining the estimated value of delay in the transmission direction according to the probability density function;
    wherein the destination device comprises the first device or the second device.

4. The method of claim 2,
    wherein the Gaussian Mixture Model comprises a plurality of Gaussian models optimized through an Expectation-Maximization (EM) algorithm.

5. The method of claim 2,
    wherein a kernel function in the Kernel Density Estimation method is a Gaussian kernel function.

6. The method of claim 2,
    wherein determining the time system error of the first device relative to the second device according to the estimated value of delay in the first transmission direction and the estimated value of delay in the second transmission direction comprises:
    determining, by the first device, the time system error of the first device relative to the second device according to the acquired estimated value of delay in the first transmission direction and estimated value of delay in the second transmission direction; or
    determining, by a collector, the time system error of the first device relative to the second device according to the acquired estimated value of delay in the first transmission direction and estimated value of delay in the second transmission direction; and
    issuing, by the collector, the time system error of the first device relative to the second device to the first device.

7. The method of claim 1,
    wherein determining the estimated value of delay in the transmission direction by using the probability density estimation method according to the plurality of delay samples in the transmission direction comprises:
    acquiring time delay noise of an environment where a destination device in the transmission direction is located;
    when the time delay noise is greater than a preset noise threshold, fitting a probability density function of the plurality of delay samples in the transmission direction by using a Gaussian Mixture Model, and determining the estimated value of delay in the transmission direction according to the probability density function; and
    when the delay noise is less than or equal to the preset noise threshold, fitting a probability density function of the plurality of delay samples in the transmission direction by using a Kernel Density Estimation method, and determining the estimated value of delay in the transmission direction according to the probability density function;

wherein the destination device comprises the first device or the second device.

8. The method of claim 1, wherein the Gaussian Mixture Model comprises a plurality of Gaussian models optimized through an Expectation-Maximization (EM) algorithm.

9. The method of claim 1, wherein a kernel function in the Kernel Density Estimation method is a Gaussian kernel function.

10. The method of claim 1, wherein determining the time system error of the first device relative to the second device according to the estimated value of delay in the first transmission direction and the estimated value of delay in the second transmission direction comprises:
determining, by the first device, the time system error of the first device relative to the second device according to the acquired estimated value of delay in the first transmission direction and estimated value of delay in the second transmission direction; or
determining, by a collector, the time system error of the first device relative to the second device according to the acquired estimated value of delay in the first transmission direction and estimated value of delay in the second transmission direction; and
issuing, by the collector, the time system error of the first device relative to the second device to the first device.

11. An electronic apparatus comprising a memory and a processor, wherein a computer program for time synchronization is stored in the memory, and the processor is configured to read and run the computer program for time synchronization to perform the method of claim 1.

12. A system for time synchronization based on in-band telemetry,
wherein the system comprises a first network device of in-band telemetry and a second network device of in-band telemetry, the first network device comprising a processor that executes instructions that cause the first network device to at least:
acquire an estimated value of delay in a first transmission direction and an estimated value of delay in a second transmission direction; and
determine a time system error of the first network device of in-band telemetry relative to the second network device of in-band telemetry according to the estimated value of delay in the first transmission direction and the estimated value of delay in the second transmission direction;
wherein the estimated value of delay in the first transmission direction is determined according to a plurality of delay samples in the first transmission direction, and the estimated value of delay in the second transmission direction is determined according to a plurality of delay samples in the second transmission direction; the first transmission direction is a direction from the second network device of in-band telemetry to the first network device of in-band telemetry, and the second transmission direction is a direction from the first network device of in-band telemetry to the second network device of in-band telemetry;
wherein an estimated value of delay in a transmission direction is determined according to the following way: determining the estimated value of delay in the transmission direction by using a probability density estimation method according to a plurality of delay samples in the transmission direction;
wherein determining the estimated value of delay in the transmission direction by using the probability density estimation method according to the plurality of delay samples in the transmission direction comprises:
fitting a probability density function of the plurality of delay samples by using a Gaussian Mixture Model, and determining the estimated value of delay according to the probability density function; or
fitting a probability density function of the plurality of delay samples by using a Kernel Density Estimation method, and determining the estimated value of delay according to the probability density function.

13. A system for time synchronization based on in-band telemetry,
the system comprises a first network device of in-band telemetry, a second network device of in-band telemetry, and a hardware collector;
wherein the hardware collector is configured to acquire an estimated value of delay in a first transmission direction and an estimated value of delay in a second transmission direction;
the hardware collector is further configured to determine a time system error of the first network device of in-band telemetry relative to the second network device of in-band telemetry according to the estimated value of delay in the first transmission direction and the estimated value of delay in the second transmission direction;
the hardware collector is further configured to issue the determined time system error to the first network device of in-band telemetry;
wherein the estimated value of delay in the first transmission direction is determined according to a plurality of delay samples in the first transmission direction, and the estimated value of delay in the second transmission direction is determined according to a plurality of delay samples in the second transmission direction; the first transmission direction is a direction from the second network device of in-band telemetry to the first network device of in-band telemetry, and the second transmission direction is a direction from the first network device of in-band telemetry to the second network device of in-band telemetry;
wherein an estimated value of delay in a transmission direction is determined according to the following way: determining the estimated value of delay in the transmission direction by using a probability density estimation method according to a plurality of delay samples in the transmission direction;
wherein determining the estimated value of delay in the transmission direction by using the probability density estimation method according to the plurality of delay samples in the transmission direction comprises:
fitting a probability density function of the plurality of delay samples by using a Gaussian Mixture Model, and determining the estimated value of delay according to the probability density function; or
fitting a probability density function of the plurality of delay samples by using a Kernel Density Estimation method, and determining the estimated value of delay according to the probability density function.

* * * * *